May 1, 1923.

E. JOHNSON

HOOK

Filed July 1, 1922

1,453,680

Inventor
Einer Johnson.

Attorney

Patented May 1, 1923.

1,453,680

UNITED STATES PATENT OFFICE.

EINER JOHNSON, OF DULUTH, MINNESOTA.

HOOK.

Application filed July 1, 1922. Serial No. 572,280.

*To all whom it may concern:*

Be it known that I, EINER JOHNSON, a citizen of the United States, residing at Duluth, in the county of St. Louis and State of Minnesota, have invented certain new and useful Improvements in Hooks, of which the following is a specification, reference being had therein to the accompanying drawing.

This invention relates to hooks and has special reference to what is known in the trade as a wire gate hook and eye.

The principal object of the invention is to provide simple means whereby the hook is prevented from unduly swinging from side to side when the gate or door to which it is attached is operated; said excessive swinging being well known to result in disfigurement both of the door or gate upon which the hook is employed as well as the jamb for said door.

Other objects and advantages of the invention will appear in the further description thereof.

In the accompanying drawing forming part of this application in which like reference characters indicate like parts:

Figure 1:
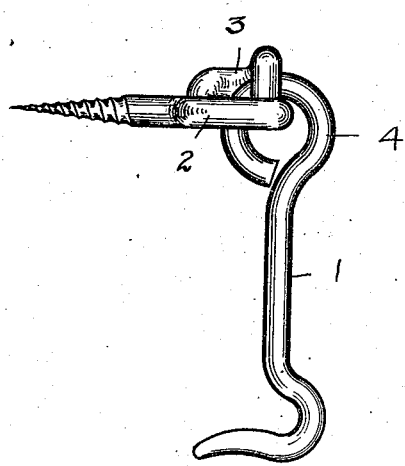
Figure 1 is a side elevation of my improved hook and eye.
Figure 2:
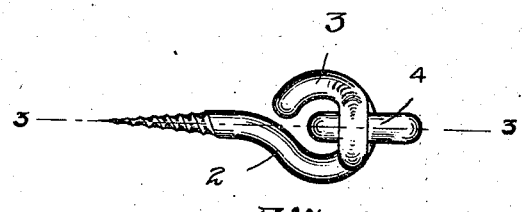
Figure 2 is a top plan view of Figure 1.
Figure 3:
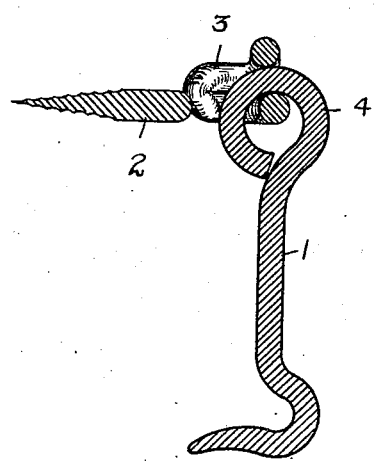
Figure 3 is a vertical sectional view on the line 3—3 Figure 2.

1 represents the hook, which is of the ordinary form, the same being suspended in a screw eye 2.

This screw eye, however, is novel in construction, in that the eye part is doubled upon itself, as at 3, and the extreme end made to overlap the eye 4 of the hook 1; thus it at all times holds said hook from swinging about unduly within the screw eye, as is obvious.

By this means the hook is positively prevented from swinging about intermediate of the door or gate when it swings shut, and from becoming caught between the door and the stop or jamb for same.

Having thus described my invention, what I claim and desire to secure by Letters Patent, is:

1. A hook of the character described suspended within a screw eye having means formed integral therewith to prevent lateral movement of the hook.

2. The combination with a hook of the character described of a suspending eye therefor folded upon itself with the extreme end overlapping the eye of the hook, substantially as and for the purpose described.

In testimony whereof I hereunto affix my signature in the presence of two witnesses.

EINER JOHNSON.

Witnesses:
S. C. BRONSON,
S. GEO. STEVENS.